LEE & REESE.
Grain-Drill.

No. 119, 31,123.

Patented Jan. 15. 1861.

Witnesses:
R. Everett
F. Clark.

Inventors:
George W. Lee
Adam R. Reese
By au'y
John F. Clark

UNITED STATES PATENT OFFICE.

G. W. LEE AND A. R. REESE, OF PHILLIPSBURG, NEW JERSEY.

IMPROVEMENT IN SEEDING-MACHINES.

Specification forming part of Letters Patent No. 31,123, dated January 15, 1861.

*To all whom it may concern:*

Be it known that we, GEORGE W. LEE and ADAM R. REES, of Phillipsburg, in the county of Warren and State of New Jersey, have invented certain new and useful Improvements in Grain-Drills; and we do hereby declare that the following is a full, clear, and exact description of the same, reference being had to the accompanying drawings, making a part of this specification.

The drawings represent more particularly those parts of the drill on which we base our claims for improvement.

Figure 1:
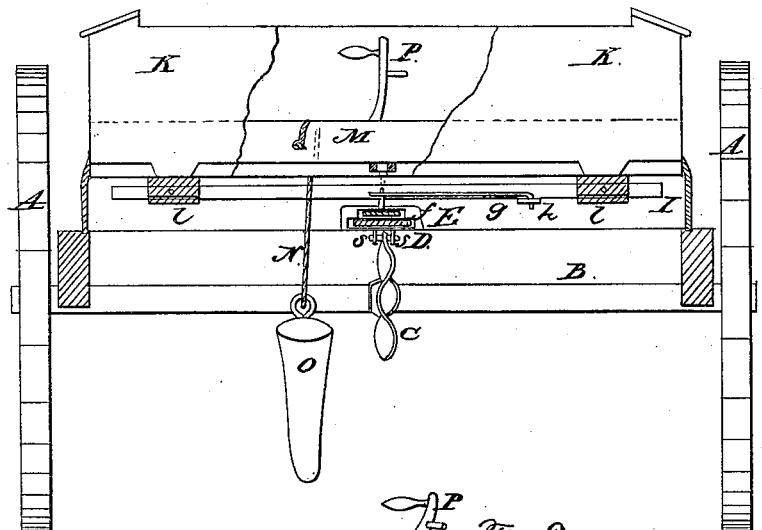
Figure 2:
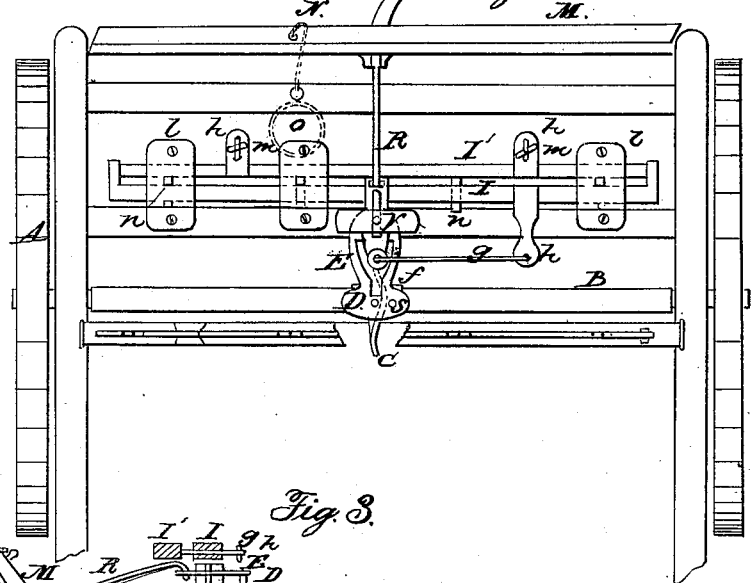

Figure 1 shows the drill having a part of the hopper removed, and Fig. 2 being also a top view with the hopper entirely removed.

Our improvements consist in an arrangement of devices, more particularly hereinafter described, for lifting the seed or furrow tube from the earth and simultaneously arresting the delivery of the seed from the hopper. We also consider it an improvement on arrangement of the sliding or feed bar for controlling the quantity of seed passing from the hopper.

To enable others skilled in the art to construct our drill, it may be thus described.

A are the driving-wheels on the saft B. C is a wave-wheel on shaft B. On one of the cross-girts is secured a box carrying the draw-plate E and skeleton plate D, those plates being retained in the box by a bolt or pin, V, passing through them. The plate D has a vibratory motion by the employment of two studs, $s\,s$, embracing the wave-wheel C between them. To render the movement easy friction-rolls are placed on the studs. At the front of the plate D (see Fig. 2) there is a slot for the stud of the draw-plate to enter when the lifting-board is turned down.

$g$ is a pitman-rod from plate E to the sliding feed-bar I I'.

R is a draw-rod from the lifting-board M to the rear end of the draw-plate.

Figure 3:
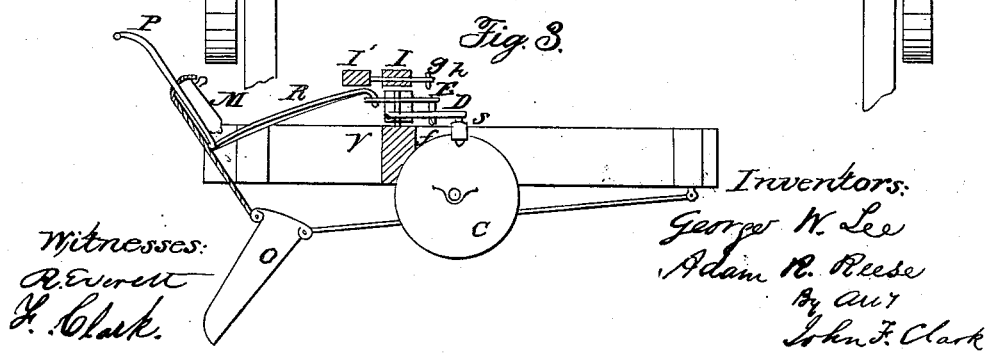

It will be readily perceived that on pushing the plate E by turning the lifting-board, the stud $f$ on E will enter the slot in the skeleton plate and unite them, so that the plates will move in unison, and consequently give the requisite motion to the feed-bar I I'; but when the plate and its stud are drawn back (see Fig. 3) the plate D vibrates without touching the stud $f$ in plate E, and as a consequence no movement of the feed-bars takes place. $h$ is one of the handles attached to feed-bar; $l\,l$, grain-plates on which the slide moves; N, a chain or rope attached to the seeding or furrow tube O and lifting-board M; P, a handle attached to the lifting-board.

The feeding-bar consists of two plates, I I', placed parallel with each other, one running or sliding in recesses of the grain-plates $l\,l$, while the other, I', is adjustable by pins made fast in one of the plates, but loosely passing through the other. These pins $n$ cross the apertures in the hopper, and on being moved from side to side force the grain from the plate below the openings of the hopper. Thus the delivery of the grain is effected without bruising it or the clogging of the machine. By suitable hose or pipe the seed is conveyed to the seed or furrow tube.

When it is requisite to diminish or increase the amount of seed passing from the hopper the bars I and I' are made to approach or recede from each other.

The pitman-rod $g$ is attached to the slide-bars I I', and the bars I and I' are retained at suitable distances apart by set-screws and bolts.

Having described our improvements in seeding-machines, what we claim as our invention, and desire to secure by Letters Patent, is—

The arrangement of the devices consisting of a wave-wheel, C, skeleton plate D, draw-plate E, provided with a stud, $f$, rods R and $g$, and feed-bars I I', substantially as herein described, when employed with a lifting-board, M, operating in the manner and for the purposes as set forth.

In testimony whereof we have signed our names before two subscribing witnesses.

GEORGE W. LEE.
ADAM R. REESE.

Witnesses:
P. R. HAGUMAN,
JOHN S. BACH.